United States Patent [19]

Aoki

[11] 4,286,850

[45] Sep. 1, 1981

[54] AUTOMATIC FOCUS INDICATING DEVICE FOR CAMERA

[75] Inventor: Harumi Aoki, Kiyose, Japan

[73] Assignee: Asahi Kogaku Kogyo Kabushiki Kaisha, Tokyo, Japan

[21] Appl. No.: 117,926

[22] Filed: Feb. 4, 1980

[30] Foreign Application Priority Data

Feb. 15, 1979 [JP] Japan ................................. 54-16446

[51] Int. Cl.³ .............................................. G03B 3/10
[52] U.S. Cl. .................................................. 354/25
[58] Field of Search ..................... 354/25, 31; 352/140; 355/56

[56] References Cited

U.S. PATENT DOCUMENTS

4,156,563  5/1979  Kato et al. .............................. 354/25
4,230,401  10/1980  Tokutomi et al. ...................... 354/25

Primary Examiner—Michael L. Gellner
Attorney, Agent, or Firm—Sughrue, Mion, Zinn, Macpeak and Seas

[57] ABSTRACT

A device for detecting and indicating the focus position of a camera from the contrast signal. A peak value detector holds the maximum value of a contrast signal produced in the camera. The stored signal is compared with the contrast signal itself as the direction of the lens is reversed and the focus signal is generated when the two signals are equal. The values stored in the peak detecting circuit is reset as the shutter button is pushed as the lens commences movement in the forward direction to prevent erroneous generation of the focus signal.

7 Claims, 9 Drawing Figures

FIG. 6B
EXTENDED
STOP
RETRACTED

FIG. 6G  ON  OFF

FIG. 9

AUTOMATIC FOCUS INDICATING DEVICE FOR CAMERA

BACKGROUND OF THE INVENTION

The present invention relates to a device for providing a focus signal at the point of focus of a photographing lens on an object to be photographed in a device which automatically detects focus by detecting the contrast of the image.

When the image of an object to be photographed is precisely focused by the photographing lens of a camera, the contrast of light and shade of the image becomes a maximum. This is due to the fact that the power spectrum (optical intensity) of the spatial frequency spectrum of the image of the object becomes a maximum at the point of focus. A number of automatic focus detecting devices have been proposed which utilize this phenomenon.

Such devices are generally structurally simple. More specifically, in such a device, a contrast detecting photoelectric element is disposed in a plane which is at a position equivalent to the plane of the surface of a film and a single contrast signal is produced in response to an object image projected onto the photoelectric element. The contrast signal thus detected becomes a maximum at the position of focus. That is, the characteristic curve of the amplitudes of the contrast signals plotted against the extension of the photographing lens has a single peak. Accordingly, in order for the device to accurately detect the focus position, it is necessary to provide means for detecting the maximum value of the contrast signal.

One example of such a detecting means is a measuring instrument with a pointer which is so designed that the deflection of the pointer is in porportion to the magnitude of the input contrast signal. With this measuring instrument, the photographer can visually detect the point maximum contrast from the maximum deflection of the pointer. However, it is rather troublesome for the photographer to detect the maximum deflection of a pointer. If it is possible to produce a focus signal in such a manner that a lamp is turned on with the aid of the focus signal only at the position of focus then the photographer can readily determine that the image of an object to be photographed is focused. However, it should be noted that it is difficult to produce a focus signal from a single contrast signal as described above because different contrast signals are obtained from different objects and accordingly the contrast signal produced at the position of focus is not always constant.

Production of a focus signal from a single contrast signal as described above may be achieved by a technique in which the maximum value of a contrast signal is stored and, when the contrast signal reaches the same maximum value again, the former and latter contrast signals are compared and, when they are equal, the focus signal is generated. However, this technique suffers from two serious problems. One of the two problems is that, if the photographing lens is reversed in direction before it reaches the true focalization position, the contrast signal apparently shows a maximum value. That is, a false peak signal is provided whereby a false focus signal is produced. The second problem is that, before the image of a new object is focused, it is necessary to reset or clear the value which has been stored for the previous object.

Because of the above-described difficulties, effective focus signals cannot be provided by conventional devices which simply extract a contrast signal from the image of an object. In order to overcome these difficulties, several improved techniques have been proposed in the art. In one of devices for practicing the conventional methods, two contrast signals produced by two contrast detecting photoelectric elements which are spaced from each other in the direction of optical axis are compared to obtain a focus signal. In another device, a contrast detecting photoelectric element is vibrated in the direction of the camera's optical axis to produce contrast signals from at least two object images and the contrast signals are compared to obtain a focus signal similar to the above-described device. However, such a device in which the contrast signals of two object images spaced in the direction of optical axis are extracted spatially or by time division is generally large in size and high in manufacturing cost.

Accordingly, an object of this invention is to eliminate the above-described difficulties. More specifically, an object of the invention is to provide an automatic focus indicating device in which a single contrast signal is utilized and in which a light emitting element is turned on at the position of focus. The device of the invention is meritorious in that it is compact and low in manufacturing cost and the point of focus can be readily determined.

SUMMARY OF THE INVENTION

These, as well as other objects of the invention, are met by a device for detecting and indicating a focus position in a camera from a single contrast signal produced in response to an image of an object to be photographed with the camera including means for producing a contrast signal in response to the image, means for detecting the directions of movement of a lens, that is, extension and retraction of the photographing lens, a peak holding circuit for storing the maximum value of the contrast signal, a reset pulse generator circuit means for generating a reset pulse for resetting the contents stored in the peak holding circuit, a comparator circuit for comparing the signal stored in the peak holding circuit means and the contrast signal for producing a focus signal when the contrast signal is equal to or greater than the signal stored in the peak holding circuit means, and means for producing an indication, that is, some signal which is perceivable by the senses of a camera user, in response to the focus signal.

The reset pulse generating circuit operates in response to an output of the lens extension direction detecting means at a time of starting extension or retraction of the lens, that is, when the lens first starts to move in a forward or rearward direction. The reset pulse generating circuit is operated in association with the shutter button of the camera in preferred embodiments wherein a reset pulse is generated at the time of shutter release. Preferably, the peak holding circuit means performs a peak detection operation during a period commencing at the generation of a reset pulse and reaching to the occurrence of the peak value of the contrast signal wherein the comparator circuit performs a comparison operation commencing at the time of occurrence of the peak value of the contrast signal so as to prevent erroneous generation of the focus signals. The lens extension direction detector is preferably constructed as a slider mounted on the lens so as to be moved as the lens moves and a stationary resistor on

DESCRIPTION OF THE PREFERRED EMBODIMENT

Figure 1:
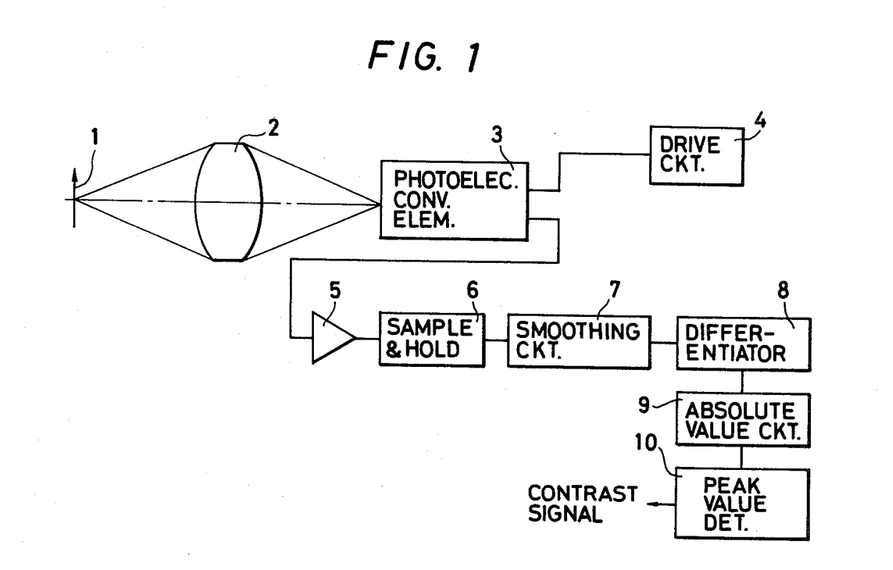
FIG. 1 is an explanatory diagram showing an example of the arrangement of a device for producing a contrast signal from the image of an object to be photographed.

The invention will be described in detail with reference to the accompanying drawings. FIG. 1 shows an example of a device for producing a contrast signal from the image of an object to be photographed. The device employs a self-scanning type photoelectric conversion element as its photoelectric conversion means. The self-scanning type photoelectric conversion element is made up of a plurality of microphotoelectric conversion elements and a scanning circuit. The self-scanning type photoelectric conversion element is called a "MOS-FET type self-scanning photoelectric conversion element" or a "CCD type self-scanning photoelectric conversion element" depending on the type of the scanning circuit employed, both of which are commercially available.

The image of an object 1 to be photgraphed is formed on a self-scanning type photoelectric conversion element 3 by a lens 2. The self-scanning type photoelectric conversion element 3 is driven by a drive circuit 4 which includes a scanning pulse generating circuit and the image is electrically scanned so that a discrete time-series waveform is provided in correspondence with the brightness of the image. The waveform is amplified by an amplifier circuit 5 and is then converted into an analog waveform by a sample-and-hold circuit 6. A smoothing circuit 7 removes unwanted high frequency components from the analog waveform as a result of which the analog waveform is coverted into a waveform which closely represents the actual distribution of brightness of the image of the object.

Figure 2:
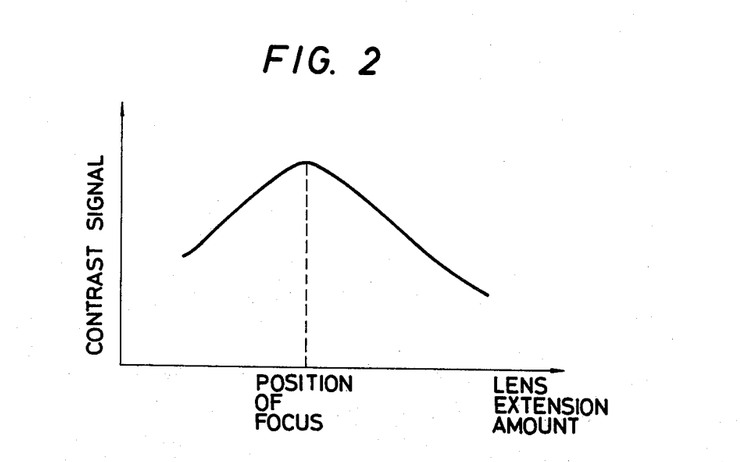
FIG. 2 is a graphical representation indicating a contrast signal which becomes a maximum at the point of focalization.

The waveform thus produced is differentiated by a differentiation circuit 8 whereby a differentiation signal representative of the gradient of image brightness distribution results. The differentiation signal is converted into a positive or negative voltage waveform by an absolute value circuit 9 and the peak value of the absolute value outputs in each scanning period is detected by a peak value detecting circuit 10. The peak value is held until another peak value is provided in the subsequent scanning period. The peak value output thus obtained is the aforementioned contrast signal. This contrast signal reaches a maximum at the position of focus. that is, at the focus position as indicated in FIG. 2.

A number of devices capable of producing such contrast signals have been proposed in the art. In one example of such a device, a number of microphotoelectric conversion elements are arranged in the plane of an image and the maximum of the differences between the statically detected outputs of adjacent elements is employed as the contrast signal.

An automatic focus indicating device according to this invention generally employs a technique by which the maximum value of the contrast signal described above is stored and, when the contrast signal again reaches the value thus stored, a focus signal is generated.

Figure 3:
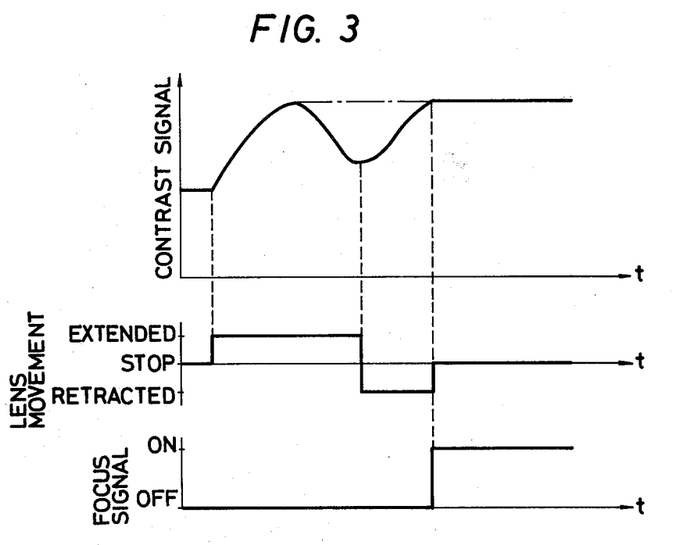
FIG. 3 is a diagram for a description of a fundamental technique employed in the invention to produce a focus signal.

FIG. 3 is a graphical representation used for a description of the technique mentioned above. More specifically, the upper part of FIG. 3 indicated variations of a contrast signal and the middle part of FIG. 3 indicates the directions of extension of a photographing lens, that is, it indicates whether the lens is being extended, retracted or its stopped. In other words, FIG. 3 illustrates the operation which occurs when the photographing lens is first extended, when it passes the position where the contrast signal becomes a maximum, when the lens is subsequently retracted and when the contrast signal becomes a maximum again after which the lens is stopped. Accordingly, if the first maximum value of the contrast signal is stored (peak hold) and the value of the contrast signal is compared with the value thus stored, then focus signal can be generated when the two values are again equal. In the upper part of FIG. 3, the dot-chain line indicates the peak level held. The lower part of FIG. 3 indicates the focus signal generated when the contrast signal is equal to the peak level held. The focus signal can be used to turn on a display lamp or to automatically stop the photographing lens at the position of focus.

Figure 4:
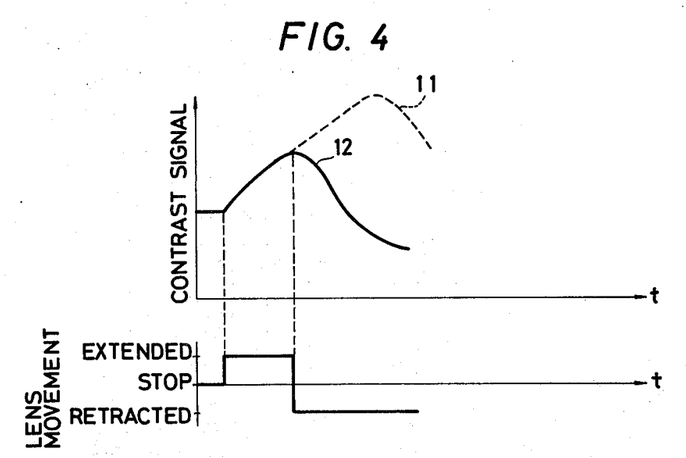
FIG. 4 is a diagram for a description of a false peak which occurs in the contrast signal.

However, it should be noted that if the device is constituted strictly in accordance with the above-described fundamental technique, two serious problems arise. One of the problems is how to reset the maximum value of the contrast signal which has been stored. That is, after the maximum value of a contrast signal of an object has been stored, the the image of another object different in contrast cannot be focused. Accordingly, in order to focus the image of the object, it is necessary to reset the value stored (peak hold reset). The other problem is that, if the lens is moved in an incorrect direction, that is, if the lens is retracted before the contrast signal becomes truly maximum, then a flase maximum value is obtained as illustrated in FIG. 4. In FIG. 4, the dotted line 11 indicates the curve of a contrast signal including its true maximum value while the solid line 12 indicates the curve of a contrast signal which is obtained when the lens is moved back before the contrast signal reaches its true maximum value. In the latter case, a false peak lower than the true peak is provided.

An essential feature of the invention is the detection of whether the photographing lens is being extended or retracted so as to prevent the generation of a focus signal with the false peak. Furthermore, in accordance with the invention, detection of the peak of a contrast signal is suspended upon the occurrence of the first peak so as to prevent instability of the focus signal caused when the peak level held coincides with the contrast signal. In addition, the device according to the invention is provided with a coincidence gate for limiting the period for deciding the coincidence of the peak hold level and the contrast signal so that no focus signal is produced before the peak is detected.

Figure 5:
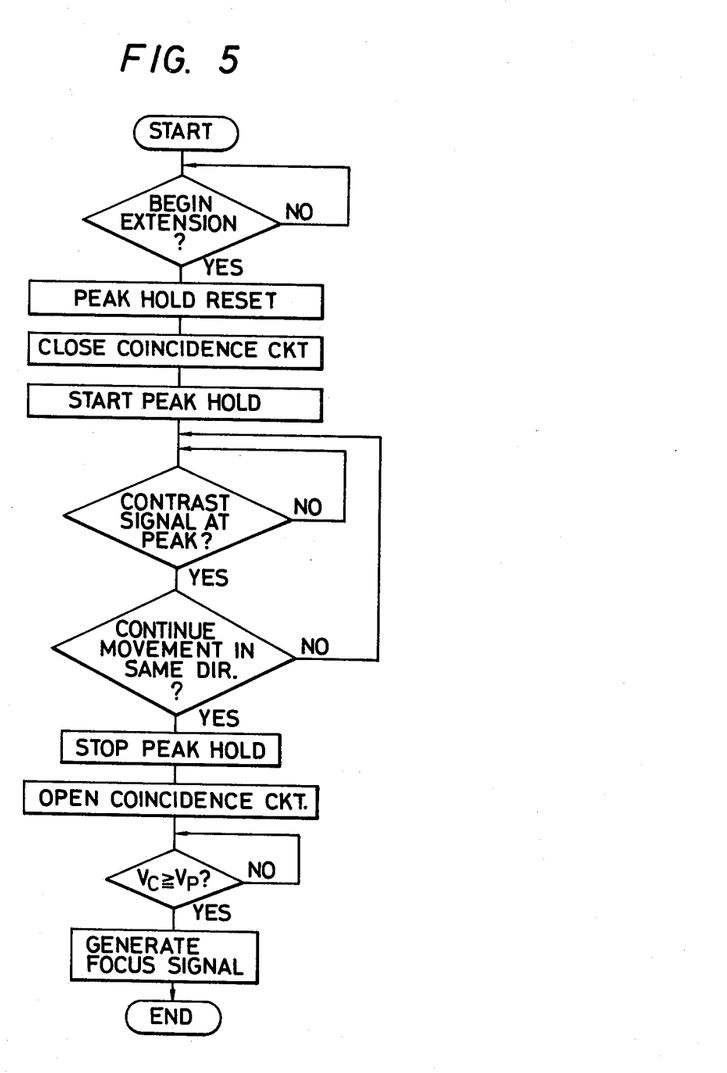
FIG. 5 is an example of a flow chart of the operation of an automatic focus indicating device according to the invention.

FIG. 5 shows a flow chart describing an example of operation of a device constructed according to the invention. In the device, the peak hold reset is carried out when the photographing lens is being moved. That is, while the lens is moved the peak hold level is reset and the coincidence gate is closed upon which the peak hold operation is started. When the contrast signal reaches a peak, it is detected whether the lens has been moved backwardly or not. Only when the lens has not been moved backwardly is it determined that the contrast signal has reached the true peak and only then is the subsequent processing is carried out. When the true peak has been detected, the peak hold operation is suspended and the true peak level is maintained. At the same time, the coincidence gate is opened so that the peak level held Vp is compared with the contrast signal Vc. When Vc≧Vp, the image of the object is focused and the focus signal is generated.

Figure 6A:
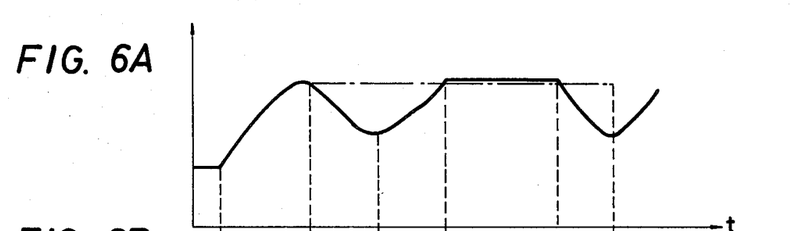
FIGS. 6A to 6E are an example of a timing chart for a description of the focus indicating operation of the device according to the invention.
Figure 6B:
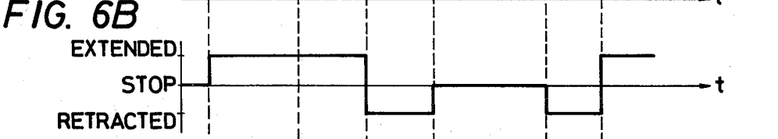
Figure 6C:
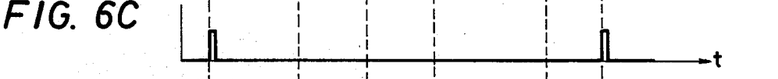
Figure 6D:
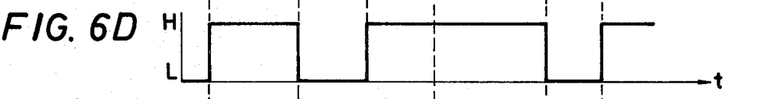
Figure 6E:
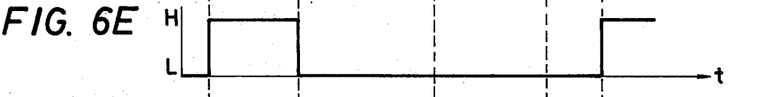
Figure 6F:
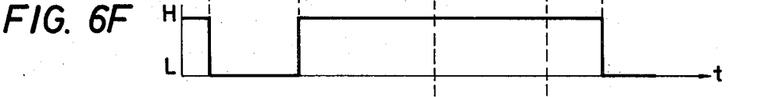
Figure 6G:
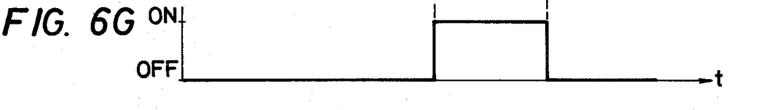

FIGS. 6A–6G taken together show an example of a timing chart illustrating the focus indicating operation of a device constructed according to the teachings of the invention. More specifically, FIG. 6A indicates variations of a contrast signal with respect to the peak level held as indicated by the dot-dash line. The FIG. 6B shows the direction of movement of a photographing lens in correspondence with the variations of the contrast signal. As is apparent from FIGS. 6A and 6B, the photographing lens, initially at a stopped position, is extended and is then retracted after the contrast signal reaches the peak value. When the peak level held is equal in value to the level of the contrast signal, the lens is stopped again. Thereafter, the photographing lens is extended and is then retracted again. The FIG. 6C shows a peak hold reset pulse which is generated each time at the instant when the lens is extended. The FIG. 6D is a waveform which indicates whether the contrast signal is increasing or decreasing. The signal indicated in FIG. 6D is produced as the output of a slope detecting circuit (described later) which operates in response to the contrast signal. In the FIG. 6D when the signal is at an "H" or high logic level, the contrast signal is increasing while when the signal is at a "L" or low logic level, the contrast signal is decreasing. FIG. 6E indicates a peak hold operation period during which the peak level at "H" is detected. The FIG. 6F indicates a coincidence gate signal. The peak hold level and the level of the contrast signal are compared while the coincidence gate signal is at "H". FIG. 6G shows the focus signal.

Figure 7:
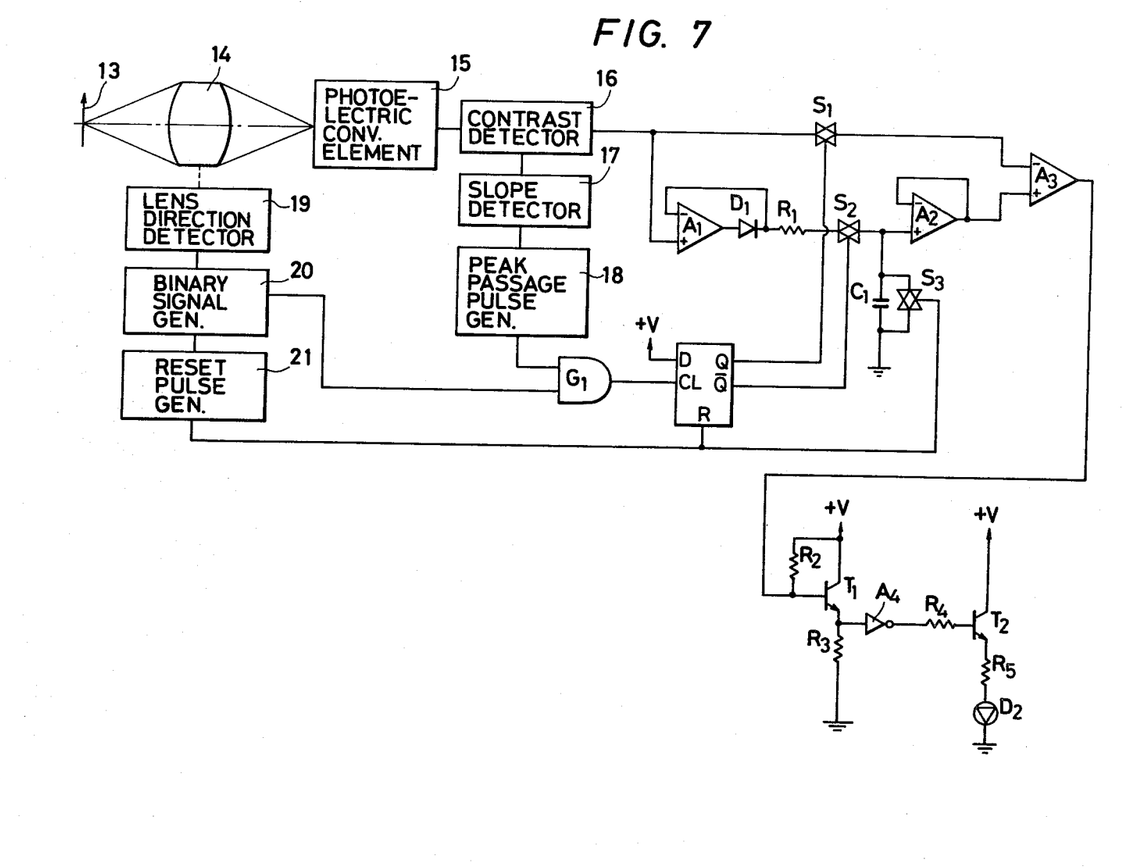
FIG. 7 shows as an example a circuit diagram of an electrical circuit used in the device of the invention.

FIG. 7 shows an example of an electrical circuit for performing the function of the automatic focus detecting device according to the invention. The image of an object to be photographed is formed on a contrast detecting photoelectric conversion element 15 by a photographing lens 14. The contrast signal of the object produced at the output of the photoelectric conversion element 15 is coupled to a contrast detecting circuit 16. This contrast detecting circuit may be the device as shown in FIG. 1. However, it may be any device capable of producing a single contrast signal from the image of an object to be photographed. The contrast signal is detected by a slope detecting circuit 17 to determine whether the contrast signal is increasing or decreasing as a result of which a binary signal is produced which is at "H" and "L" respectively when the contrast signal is increasing and decreasing. When the contrast signal changes from an increasing to a decreasing state, a pulse is generated by a peak passage pulse generating circuit 18, that is, upon detection of a falling edge of the aforementioned binary signal. The pulse, or the peak passage pulse, is applied to one input terminal of an AND circuit $G_1$.

On the other hand, a lens extension direction detecting circuit 19 detects the directions of movement of the lens and accordingly drives a binary signal forming circuit 20. As a result, the circuit 20 provides a binary signal which is at "H" when the lens is being extended and at "L" when the lens is being retracted. The binary signal is applied to the other input terminal of the AND circuit $G_1$. When the aforementioned peak passage pulse is applied to the AND circuit $G_1$ while the lens is being extended or contracted, a pulse waveform appears at the output terminal of the AND circuit $G_1$. The output waveform of the binary signal forming circuit 20 is applied to a peak hold reset pulse generating circuit 21 as a result of which one pulse is generated thereby at the start of each extension of the lens. The pulse can be formed upon detection of a rise of the output waveform of the circuit 20. The contrast signal coupled to the contrast detecting circuit 16 is applied to a peak hold circuit, which includes an operational amplifier $A_1$, a diode $D_1$, a resistor $R_1$ and a capacitor $C_1$, with which the peak value of the contrast signal is detected.

The peak signal held, that is the output of the peak hold circuit, is applied through a buffer amplifier or operational amplifier $A_2$ to a comparator $A_3$ where it is compared with another contrast signal. The contrast signal is applied to the comparator under the control of an analog switch $S_1$ while the peak signal held is applied to the comparator under the control of analog switch $S_2$. That is, application of these signals is controlled by the operations of the analog switches $S_1$ and $S_2$ which are in turn controlled by the outputs of a D-type flip-flop circuit $F_1$. This flip-flop circuit $F_1$ is operated by the peak hold reset pulse which is applied to its reset terminal R and the peak passage pulse applied to its clock terminal CL as a result of which the outputs as shown in FIG. 6E and 6F are provided at the output terminals $\bar{Q}$ and Q, respectively. The capacitor $C_1$ is charged by the peak value signal but is discharged by the operation of an analog switch $S_3$ which is controlled by the peak hold reset pulse as a result of which the peak hold signal is reset. The output of the comparator $A_3$ is applied to a circuit composed of a transistor $T_1$ and a buffer converter $A_4$ where it is converted into a control signal which, when the contrast signal is equal to or greater than the peak level held, renders a transistor $T_2$ conductive. When the transistor $T_2$ conducts, current flows in a light emitting diode $D_2$ turning it on. Thus, the light emitting diode is operated emitting light at the point of focus.

Figure 8:
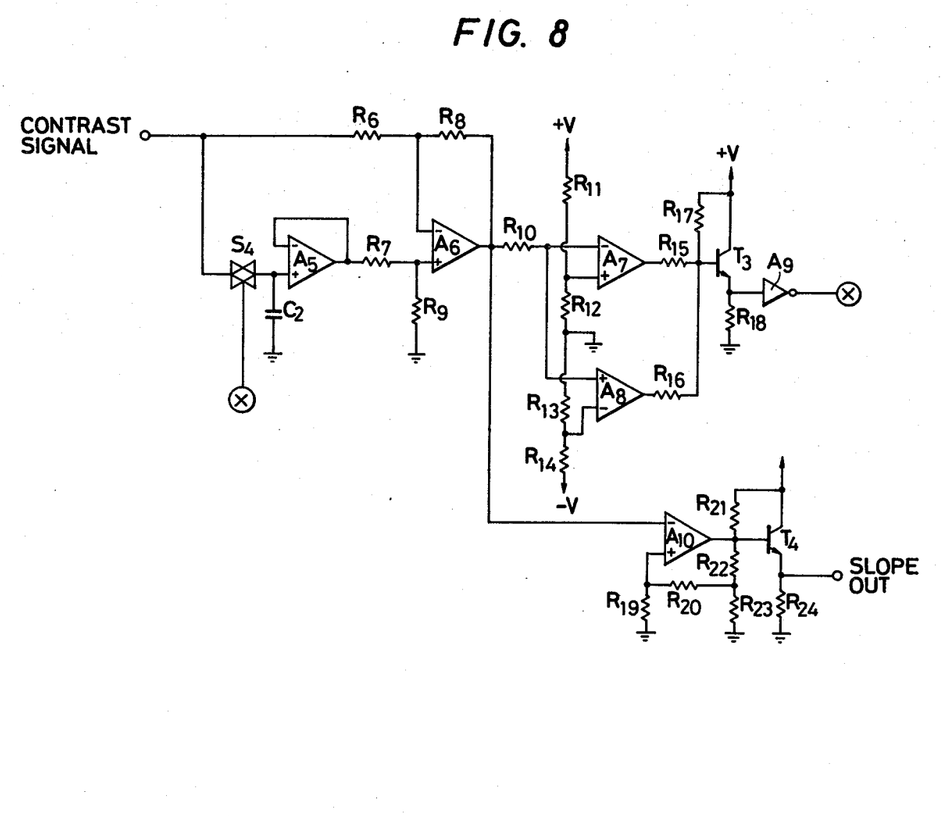
FIG. 8 is a circuit diagram showing an example of a slope detecting circuit used with the device of the invention.

An example of the slope detecting circuit 17 in FIG. 7 is as shown in FIG. 8. The contrast signal provided by the contrast detecting circuit 16 is sampled and held by a buffer amplifier constructed of an operational amplifier $A_5$, an analog switch $S_4$ and a capacitor $C_2$. The voltage difference between the signal thus sampled and held and the contrast signal applied through a resistor $R_6$ is obtained by a differential amplifier in the form of an operational amplifier $A_6$. A window comparator composed of operational amplifiers $A_7$ and $A_8$, a transistor $T_3$ and an inverter $A_9$ converts the voltage difference thus obtained into a digital signal which assumes the "H" level when the voltage difference exceeds predetermined positive and negative threshold values. This digital signal controls the aforementioned analog switch $S_4$.

The output of the differential amplifier $A_6$ is applied by a hysteresis comparator including an operational amplifier $A_{10}$ which detects whether the voltage difference exceeds the positive threshold value of the negative threshold value and as a result provides a binary signal whose level is "H" when the contrast signal is increasing and "L" when the contrast signal is decreasing.

Figure 9:
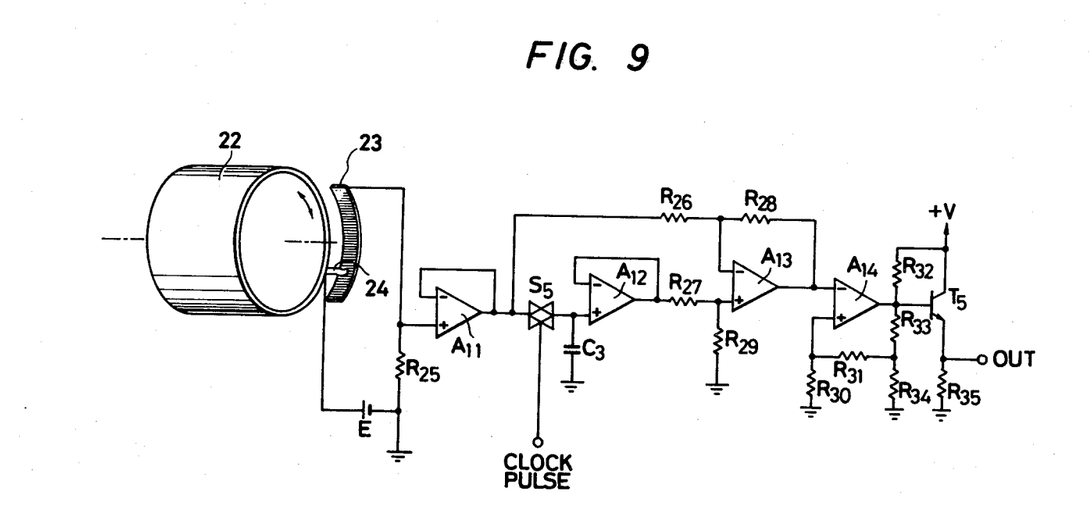
FIG. 9 is an explanatory diagram, partly as a circuit diagram, showing an example of a lens extension direction detecting circuit in the device of the invention.

FIG. 9 shows an example of the lens extension direction detecting circuit 19 in FIG. 7. A lens 22 is provided with a slider or wiper 24 which slides on a stationary resistor 23 as the lens 22 is rotated. That is, the lens 22 is provided with a variable resistor whose wiper moves as the lens is rotated. As the lens is rotated, the resistance between the slider 24 and one end of the resistor 23 changes. With a power source E and a resistor $R_{25}$ connected to the variable resistor as shown in FIG. 9, the voltages across the resistor $R_{25}$ varies as the lens is rotated. The voltage thus varied is applied through a buffer amplifier composed of an operational amplifier $A_{11}$ to a sample-and-hold circuit including an analog switch $S_5$ and a capacitor $C_3$. The voltage difference between the sampled and held signal and the signal not subjected to a sample-and-hold operation is obtained by a differential amplifier formed by an operational amplifier $A_{13}$. In order to drive the sample-and-hold circuit, a train of pulses generated by a suitable clock pulse generator are applied to the sample-and-hold circuit. The voltage difference thus obtained is applied to a circuit composed of a hysteresis comparator having an operational amplifier $A_{14}$ and a transistor $T_5$ where it is converted into a binary signal whose level is "H" when the voltage difference exceeds a predetermined positive threshold value and "L" when the voltage difference exceeds a predetermined negative threshold value. Thus, the binary signal is a digital signal which has two values representing extention and retraction of the lens. In the example shown in FIG. 9, a variation of the resistance is utilized. However, a similar device can be provided in which variations in magnetism or in luminous flux are employed for providing the detector 19.

As is apparent from the above description, with the automatic focus indicating device according to the invention, the focus signal is produced at the position of focus using a device for operating in response to the contrast signal formed with respect to an object image and a device for detecting the direction of movement of the lens.

Therefore, the automatic focus indicating device according to the invention is simpler in construction and lower in manufacturing cost than the conventional device in which, for instance, the contrast signals of more than two object images spaced in the direction of optical axis from each other are dtected.

As the device of the invention includes means for detecting the directions of movement of the lens, the provision of a false peak value different from the true peak value of the contrast signal indicating the true focus is prevented. This is one of the significant merits of the invention. Furthermore, as the reset pulse for resetting the peak hold signal can be provided from the lens extending device, the camera having a focus indicating device of the invention can be easily operated and is free from erroneous operation caused when the peak hold signal is not reset. This is another merit of the invention.

The reset pulse may be provided by utilizing other components of the camera as the case may be. For instance, the peak hold signal may be reset at the time of shutter release in association with the operation of the shutter button. Furthermore, by the utilizing the focus signal produced by the device of the invention, a light emitting element such as a light emitting diode or a lamp can be turned on or an audio indication signal can be produced or the movement of the lens can be automatically stopped. Thus, a camera having a device of the invention can be readily focused on an object.

What is claimed is:

1. A device for detecting and a indicating a focus position in a camera from a single contrast signal produced in response to an image of an object to be photographed with said camera comprising: means for producing said contrast signal in response to said image; means for detecting the directions of movement of a lens; a peak holding circuit for storing the maximum value of said contrast signal; reset pulse generating circuit means for generating a reset pulse for resetting the contents stored in said peak hold circuit; a comparator circuit for comparing a signal stored in said peak holding circuit means and said contrast signal for producing a focus signal when said contrast signal is equal to or greater than said signal stored in said peak holding circuit means; and means for producing an indication in response to said focus signal.

2. The device as claimed in claim 1 wherein said reset pulse generating circuit operates in response to an output of said lens extension direction detecting means at a time of starting extension or retraction of said lens.

3. The device as claimed in claim 1 wherein said reset pulse generating circuit is operated in association with the shutter button of said camera wherein a reset pulse is generated at the time of shutter release.

4. The device as claimed in claim 1 wherein said peak holding circuit means performs a peak detection operation thereof during a period of from generation of said reset pulse to the occurrence of a peak value of said contrast signal wherein said comparator circuit performs a comparison operation commencing at the time of occurrence of said peak value of said contrast signal so as to prevent erroneous generation of a focus signal.

5. The device as claimed in claim 1 wherein said lens extension direction detector comprises: a slider mounted on said lens so as to be moved by moving said lens; and a stationary resistor on which said slider moves wherein movement of said lens is converted into a resistance value.

6. The device as claimed in claim 1 wherein said indication producing means comprises: a light emitting element for indicating said focus position.

7. The device as claimed in claim 1 wherein said indication producing means comprises: means for producing a sound for indicating said focus position.

* * * * *